US007350539B2

(12) United States Patent
Kaneko

(10) Patent No.: US 7,350,539 B2
(45) Date of Patent: Apr. 1, 2008

(54) ELECTROMAGNETIC CONTROLLED FUEL INJECTION APPARATUS WITH POPPET VALVE

(75) Inventor: Takashi Kaneko, Sagamihara (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 38 days.

(21) Appl. No.: 11/359,435

(22) Filed: Feb. 23, 2006

(65) Prior Publication Data

US 2006/0185650 A1 Aug. 24, 2006

(30) Foreign Application Priority Data

Feb. 24, 2005 (JP) ............................ 2005-049304
Nov. 18, 2005 (JP) ............................ 2005-334725

(51) Int. Cl.
*F16K 21/10* (2006.01)
*F16K 31/00* (2006.01)

(52) U.S. Cl. ........................................ 137/514; 251/64

(58) Field of Classification Search ................ 123/467, 123/506; 137/514; 251/48, 64
See application file for complete search history.

(56) References Cited

U.S. PATENT DOCUMENTS 455,913 A * 7/1891 Walker ........................ 137/534
4,566,485 A * 1/1986 Ruhle .......................... 137/375
5,284,302 A 2/1994 Kato et al.
5,392,811 A * 2/1995 Maley et al. ............... 137/514
5,427,352 A 6/1995 Brehm
5,443,209 A 8/1995 VanAllsburg
6,021,999 A 2/2000 English et al.
6,109,541 A 8/2000 Beatty et al.
6,145,805 A * 11/2000 Smith et al. .................. 251/48
6,223,761 B1 * 5/2001 Najmolhoda et al. .......... 137/14
6,305,355 B1 * 10/2001 Hoffmann et al. .......... 123/467
2003/0226911 A1 12/2003 Gottemoller et al.
2004/0011888 A1 1/2004 Seelbach et al.
2004/0011893 A1 1/2004 Heine et al.
2004/0195349 A1 10/2004 Seelbach et al.

FOREIGN PATENT DOCUMENTS

EP 1 371 842 A1 12/2003
JP 5-223031 8/1993
WO 99/09318 2/1999

* cited by examiner

*Primary Examiner*—Thomas Moulis
(74) *Attorney, Agent, or Firm*—Wenderoth, Lind & Ponack, L.L.P.

(57) ABSTRACT

An electromagnetic controlled fuel injection apparatus has a poppet valve which controls the beginning and end of fuel injection by reciprocation. Inertia force and friction force arising from the reciprocating motion of the poppet valve are utilized effectively to suppress bounce of the poppet valve. The poppet valve has a sealed inside space, and a plurality of mass objects are received in the inside space so that the mass objects can move axially while contacting with each other in the inside space due to the inertia force generated by the reciprocating motion of the poppet valve.

10 Claims, 4 Drawing Sheets

ELECTROMAGNETIC CONTROLLED FUEL INJECTION APPARATUS WITH POPPET VALVE

BACKGROUND OF THE INVENTION

1. Field of the Invention

The present invention relates to an electromagnetic controlled fuel injection apparatus applied to an electromagnetic controlled unit injector, etc. for a diesel engine. Fuel injection timing thereof is controlled by means of a poppet valve which is reciprocated by means of a solenoid device to open or close a passage between a fuel passage to a plunger chamber where fuel is received and compressed to high pressure and a spill passage to a fuel return line.

2. Description of the Related Art

An electromagnetic controlled unit injector applied to a diesel engine is composed such that fuel injection timing is controlled through shutting-off or allowing communication of a fuel passage, which connects to a plunger room where fuel is introduced and compressed to high pressure, with a spill passage connecting to a fuel return line by closing and opening a poppet valve reciprocated by a solenoid device and a poppet valve spring.

Injection of fuel begins when the poppet valve sits on the seat portion of the valve seat and ends when the poppet valve leaves the seat portion. There is a problem that, a bounce of the poppet valve occurs when the poppet valve seats on the seat portion of the valve seat or when the poppet valve seats on the bottom seat face of the injector body. That is, the poppet valve rebounds from the seat portion at the beginning of injection and rebounds from the bottom seat face of the injector body at the end of injection, which causes irregular fuel injection at the start and end of injection.

A means to prevent the occurrence of valve bounce is disclosed in JP5-223031A (U.S. Pat. No. 5,284,302).

According to this disclosure, in an electromagnetic fuel injection valve, a magnetic powder of a specified mass is received in a sealed inside space formed inside the needle valve so as to be axially movable therein. The magnetic powder, which is an inertial collision element, moves in the inside space by inertia force generated by the movement of the needle valve and collides against the undersurface of a plug screwed in the upper part of the inside space of the needle valve or against the bottom face of the inside space. The occurrence of bounce of the needle valve when the needle valve seats on the stopper plate in the upper part or on the valve seat portion in the lower part is restrained, and the durability of the electromagnetic fuel injection valve is improved.

However, in JP5-223031A (U.S. Pat. No. 5,284,302), the magnetic powder is received in an enclosed space inside the needle valve. The magnetic powder is allowed to move in the enclosed space by the inertia force to collide against the undersurface of a plug screwed in the upper part of the inside space of the needle valve. There is a fear that the magnetic powder leaks out of the inside space when enclosing it in the inside space or the magnetic powder leaks through the gap in the screwed part of the screw plug and mixes in the fuel, resulting in jeopardizing safe and stable operation of the engine.

Further, when a magnetic substance is used for the valve body of the electromagnetic valve, the original magnetic flux is disturbed, attraction may change, and it may happen that the magnetic substance does not contact the bolt when bouncing if the magnetic substance is attracted by the magnetic force of the solenoid. When the magnetic substance rebounds, it does not collide with the bolt, and a bounce restraining effect does not result.

When a nonmagnetic solid substance is used, influences by magnetic force do not occur when it is used as an electromagnetic valve. However, in order to allow it to collide with the needle valve with a specified time lag, matching of the distance of movement, orifice diameter, spring force of the spring, and mass of the piston is necessary. As to the movement of the needle valve, there may be a case where the direction of the movement of the needle valve changes halfway from the opening direction to the closing direction, or vice versa, and the needle valve moves between the seat position and midway of its lift when bouncing repeats, so there is a possibility that the distance of movement of the inertial collision element changes.

Further, it is expected that the bounce is restrained by a single collision of the inertial collision element such as the magnetic powder, and to cope with a repetition of bounce is not considered.

Particularly, it is effective to inject fuel in amounts to meet exhaust emission regulations, and when the electromagnetic valve is energized again immediately after the first injection in multistage injection, the position of the inertial collision element in the inside space of the needle valve varies according to the conditions.

SUMMARY OF THE INVENTION

The object of the present invention is to provide an electromagnetic controlled fuel injection apparatus with a poppet valve of which the beginning and end of fuel injection is controlled by the reciprocation of the poppet valve. Inertia force and friction force due to the reciprocating motion of the poppet valve should be utilized effectively to suppress the bounce of the poppet valve.

To attain the object, the present invention proposes an electromagnetic controlled fuel injection apparatus with a poppet valve. The beginning and end of fuel injection is controlled by opening and closing a passage connecting to a fuel passage communicating to a plunger chamber where fuel is compressed to high pressure by a plunger and to a spill passage communicating to a fuel return line by means of a poppet valve reciprocated by a solenoid device and a poppet valve spring. The poppet valve has a sealed inside space, and a plurality of mass objects are received in the inside space so that the mass objects can move while contacting with each other in the inside space due to inertia force generated by the reciprocating motion of the poppet valve.

In the invention, it is preferable that the mass objects are received in the inside space of the poppet valve together with a liquid such as fuel or lubrication oil.

In the invention, it is preferable that the mass objects are spherical bodies made of material including metal.

According to the invention, as a plurality of spherical bodies such as steel balls are received axially movably in the enclosed space 1*a* provided inside a poppet valve 1 reciprocated by the solenoid device and poppet valve spring, the spherical bodies exert inertia force to the poppet valve in the direction opposite to the bouncing direction of the poppet valve by colliding against an end of the inside space of the poppet valve when the poppet valve seats on the seat portion of the valve seat member or seats on the seat face of the injector body and begins rebounding.

It is necessary that there is a time lag between the seating of the poppet valve and the collision of the mass objects.

By receiving a plurality of mass objects in the inside space, stochastically several of the mass objects collide with the poppet valve in the inside space irrespective of the positions of the mass objects in the inside space.

Further, by receiving liquid such as fuel or lube oil in the inside space of the poppet valve together with the mass objects, resistance to the movement of the mass objects in the inside space of the poppet valve can be adjusted, and the mass objects can be allowed to collide against an end of the inside space at the time the rebounding of the poppet valve is restrained most effectively.

Therefore, the occurrence of irregular injection beginning and end, variation of injection quantity, and irregular injection resulting from the bouncing of the poppet valve can be positively prevented.

Further, as the mass objects received in the inside space of the poppet valve are solid bodies such as spherical bodies, they can be inserted easily into the inside space. Fear of spilling them from the inside space when inserting them or during operation of the engine is eliminated, handling is easy, and safety is increased.

In the invention, it is preferable that the distance (Ls) of movement of the mass objects in the inside space in the axial direction of the poppet valve is defined to be equal to or smaller than the stroke (Lp) of reciprocation of the poppet valve, i.e. $(Ls \leqq Lp)$.

With the configuration, the mass objects contact without fail an opposite side end of the inside space opposite to the moving direction of the poppet valve and moves together with the poppet valve, and the mass objects can be allowed to collide against the other side end of the inside space to exert inertia force in the direction by which to restrain the rebounding of the poppet valve when it seats on the seat face of the injector body. Further, when the rebound is not completely prevented and repetition of bounces, i.e. bounce vibration occurs, the bounce vibration can be attenuated by reciprocation of the mass objects in the inside space.

In the invention, it is preferable that the mass objects are needle-like bodies made of material including metal. With this composition, as the mass objects received in the inside space are needle-like bodies, contacting portions of them increases and friction resistance when the needle-like bodies move in the inside space of the poppet valve can be increased. The range of adjustment of resistance for the needle-like bodies in the inside space, so that the needle-like bodies collide against an end of the inside space at the time optimal to restrain bouncing of the poppet valve, can be increased.

It is also suitable that the electromagnetic controlled fuel injection apparatus is composed such that the poppet valve has an inside space, and a small hole is provided at an end or each of both ends of the inside space to communicate the inside space to an outside fuel passage, whereby fuel is allowed to flow in or out of the inside space through the small hole by the reciprocating motion of the poppet valve.

According to the invention, as a dash pot function is performed by the flowing of fuel into or out of the inside space of the poppet valve through the small hole in correspondence with the reciprocation of the poppet valve, bouncing of the poppet valve from the seat after it seats on the seat can be restrained by the dash pot function.

By combining the means to restrain the bouncing with the dash pot function and the means to restrain bouncing by the inertia force of the mass objects, that is, by receiving a plurality of mass objects axially movably while contacting with each other in the inside space of the poppet valve composed to have a dash pot function, the effect of restraining bouncing is further increased by being doubly effected by the damping effect of the dash pot function and the bounce restraining effect of the inertia force of the mass objects.

In the invention, it is preferable that the distance (Ls) of movement of the mass objects in the inside space, where fuel oil can flow into or out from through the small hole, in the axial direction of the poppet valve is defined to be equal to or smaller than the stroke (Lp) of reciprocation of the poppet valve, i.e. $(Ls \leqq Lp)$.

With this configuration, bouncing can be prevented or restrained when the poppet valve seats on the seat portion of the valve seat member or seats on the seat face of the injector body.

Further, when the rebound is not completely prevented and repetition of bounces, i.e. bounce vibration occurs, the bounce vibration can be attenuated by reciprocation of the mass objects in the inside space.

According to the present invention, inertia force of several of a plurality of the mass objects can be exerted in the direction contrary to the bouncing direction at optimal timing to prevent or restrain the bouncing of the poppet valve regardless of the positions of the mass objects in the inside space. Therefore, bouncing of the poppet valve can be effectively prevented or restrained in a wide range of operation compared to the prior art, in which bouncing is restrained under a definite condition, and the occurrence of irregular injection beginning and injection end, variation of injection quantity, and irregular injection resulting from the bouncing of the poppet valve can be prevented.

Further, as the mass objects received in the inside space of the poppet valve are solid bodies such as spherical bodies, they can be inserted easily into the inside space. Fear of spilling of them from the inside space when inserting them or during operation of the engine is eliminated, handling is easy, and safety is increased.

Further, according to the invention, the apparatus is composed such that a dash pot function is performed by the flowing of fuel into or out of the inside space of the poppet valve through the small hole in correspondence with the reciprocation of the poppet valve. Bouncing of the poppet valve from the seat after it seats on the seat can be restrained by the dash pot function.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 7:
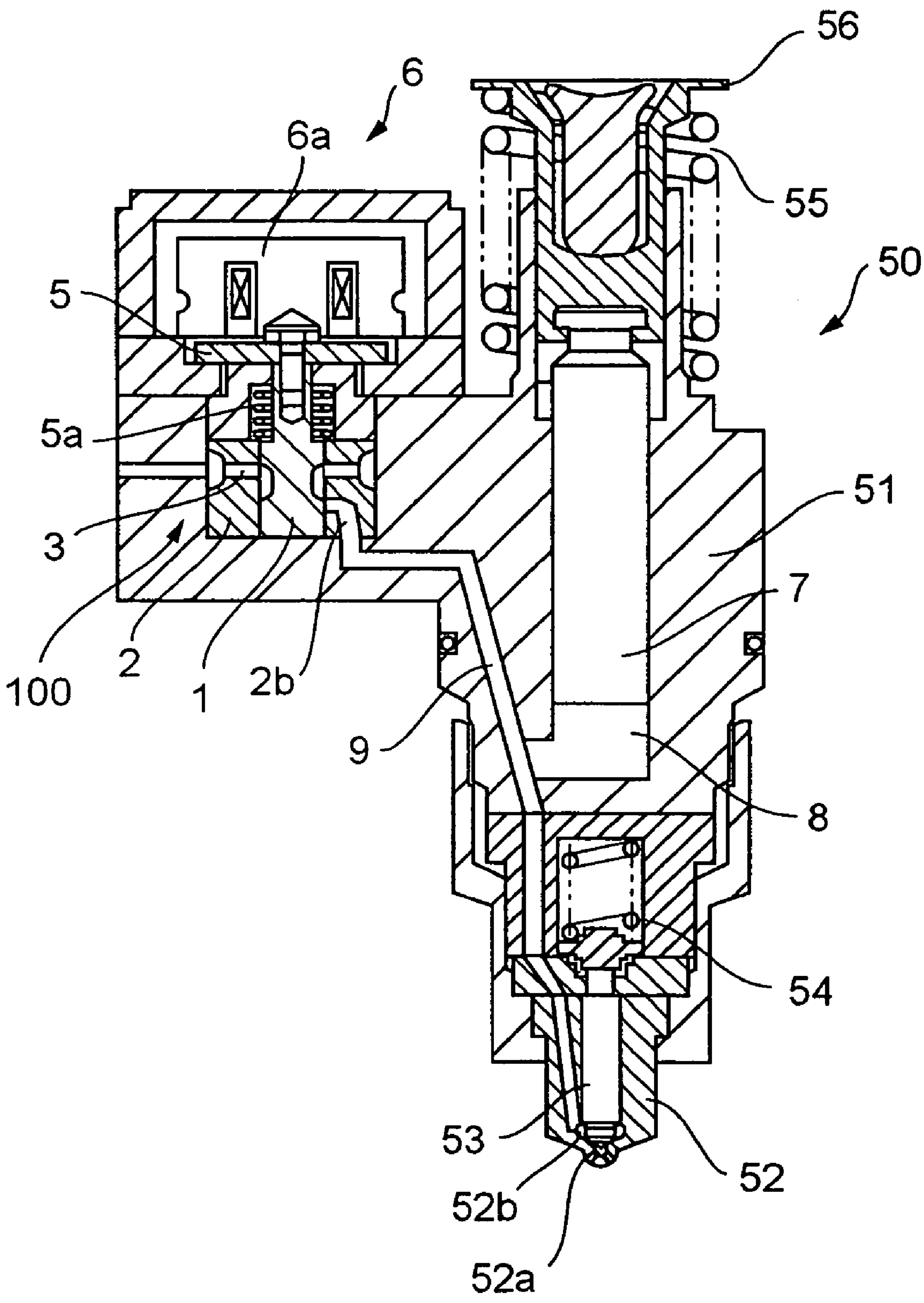
FIG. 7 is a longitudinal sectional view of an electromagnetic controlled unit injector for a diesel engine to which the present invention is applied.

FIG. 7 is a longitudinal sectional view of an electromagnetic controlled unit injector for a diesel engine to which the present invention is applied.

In FIG. 7, reference numeral 50 is an electromagnetic controlled unit injector. Reference numeral 51 is an injector body, 7 is a plunger provided reciprocatably in the injector body 51, 56 and 55 are respectively a tappet and a tappet spring for reciprocating the plunger 7, 8 is a plunger chamber in which fuel is pressurized by the plunger 7, and 9 is a fuel passage. 52 is an injection nozzle having injection holes 52*a* from which high pressure fuel in the plunger chamber 8 is injected into the combustion chamber of an engine (not shown in the drawing) 53 is a needle valve provided reciprocatably in the fuel injection nozzle 52, and 54 is a needle valve spring exerting force to the needle valve 53.

Reference numeral 100 is an electromagnetic valve device composed as follows:

Reference numeral 1 is a poppet valve, 2 is a valve seat member in which the poppet valve 1 is inserted reciprocatably, 5*a* is a poppet vale spring, 2*b* is a fuel passage communicating to the fuel passage 9 in the injector body 51, and 3 is a spill passage. Reference numeral 6 is a solenoid device having an electromagnetic coil 6*a* and 5 is an armature fixed to the upper end of the poppet valve 1 which can be attracted to be lifted upward by the electromagnetic coil 6*a*.

In operation of a diesel engine equipped with the electromagnetic controlled unit injector 50, fuel is introduced into the plunger chamber 8 and compressed therein by the reciprocation of the plunger 7 driven by a fuel cam of the engine by the medium of the tappet 56 and tappet spring 55.

When the armature 5, fixed to the poppet valve 1 of the electromagnetic valve device 100, is attracted toward the electromagnetic coil 6*a* of the solenoid device 6 upon excitation of the solenoid device 6, the poppet valve 1 is seated onto the seat portion 4 of the valve seat member 2 to close the poppet valve. Then the fuel pressure in the plunger chamber 8, in the fuel passage 2*b*, in the electromagnetic valve device 100, in the passage 9 in the injector body 51, and in the fuel passage communicating to a fuel pool 52 increases as the plunger 7 moves down.

When the fuel pressure exceeds the opening pressure of the needle valve 53, the needle valve 53 opens and high pressure fuel is injected from the injection hole 52*a* into the combustion chamber (not shown in the drawing).

When the excitation of the solenoid device 6 is released, the armature 5 moves down pushed by the poppet valve spring 5*a*. The poppet valve 1 leaves the seat portion 4 of the valve seat member 2, a seat passage is formed between the poppet valve and valve seat member, and the fuel in the plunger room 7 is discharged through the fuel passage 9 and 2*b* to the spill passage 3.

The present invention relates to an improvement of the electromagnetic open/close valve device 100 of an electromagnetic controlled fuel injection apparatus such as an electromagnetic controlled fuel injector 50.

First Embodiment

Figure 1:
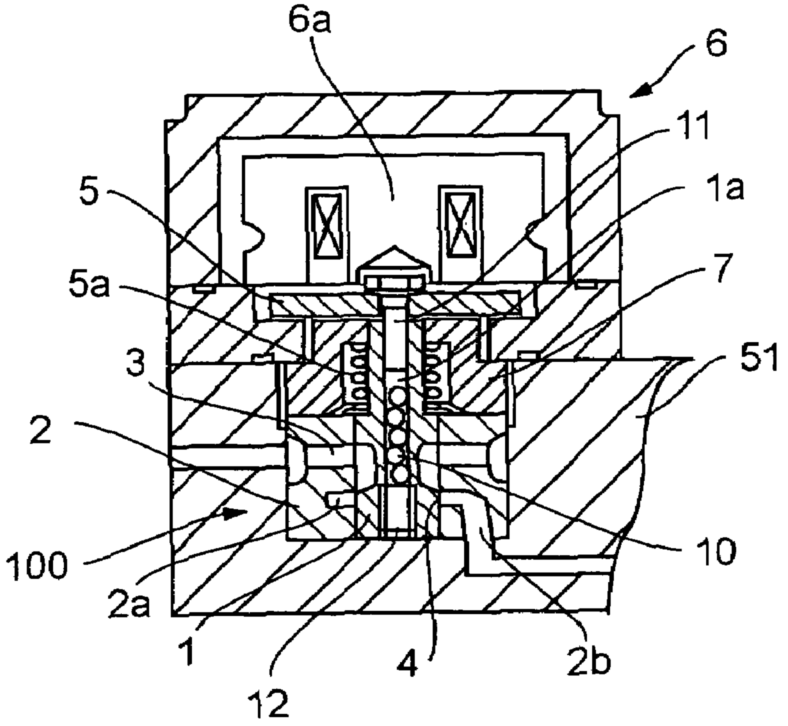
FIG. 1 is a sectional view of a substantial part of a first embodiment of an electromagnetic open/close valve with a poppet valve of an electromagnetic controlled unit injector for a diesel engine according to the present invention.

FIG. 1 is a sectional view of a substantial part of the first embodiment of the electromagnetic open/close valve with a poppet valve of an electromagnetic controlled unit injector for a diesel engine according to the present invention.

Referring to FIG. 1, reference numeral 6 is a solenoid device, 6*a* is a electromagnetic coil of the solenoid device, 1 is a poppet valve, 5*a* is a poppet valve spring, 2 is a valve seat member in which the poppet valve 1 is fitted reciprocatably, and 4 indicates the seat portion where the poppet valve 1 seats. The poppet valve 1 is reciprocated by the attraction of solenoid device 6 and the spring force of the poppet valve spring 5*a*. Reference numeral 2*a* is a fuel pool communicating to a fuel passage 2*b*, and 3 is a spill passage in the valve seat member 2.

Reference numeral 5 is an armature fixed to the upper end of the poppet valve 1. The armature can be attracted by the electromagnetic coil 6*a*.

Reference numeral 1*a* is an inside space formed inside the poppet valve 1 to extend along the center axis 1*b* of the poppet valve. The inside space 1*a* is substantially an enclosed space closed with a fixing bolt 11 for fixing the armature 5 at the upper side thereof and closed with a plug 12 at the lower side thereof.

Reference numeral 10 is a plurality of spherical bodies received in the inside space 1*a*. The spherical bodies 10 may be steel balls, rubber balls, or plastic balls. The spherical bodies 10 are received in the inside space 1*a* in a single file column (i.e. there is a single column of individual mass objects 10) so that they can move axially therein and contacting with each other when the poppet valve 1 reciprocates.

In the first embodiment, as a plurality of the spherical bodies 10 such as steel balls are received axially movably in the enclosed space 1*a* provided inside the poppet valve 1 reciprocated by the solenoid device 6 and poppet valve spring 5*a*, when the solenoid device 6 is excited and the poppet valve 1 is moved upward at the injection beginning and the poppet valve 1 seats on the seat portion 4 of the valve seat member 2 and stops upward moving, the spherical bodies 10 continue moving upward and some of the spherical bodies 10 collide against the upper end of the inside space 1*a*, i.e. the lower end of the fixing bolt 11, and exert an upward force to the poppet valve 1 at the beginning of rebound of the poppet valve 1 to push it up to counteract the downward rebounding force thereof.

The downward rebound of the poppet valve occurs some time after it seats on the seat portion 4 of the valve member 2, so it is necessary that the spherical bodies collide against the upper end of the inside space 1*a* at a time optimal for restraining the rebound of the poppet valve 1 some time after the poppet valve seats on the seat portion. The time from the departure of the spherical bodies from the lower end of the inside space 1*a* when the poppet valve 1 seats on the seat portion 4 of the valve seat member 2 until the collision against the upper end of the inside space 1*a* differs according to the velocity of the spherical bodies and the distance of movement thereof in the inside space 1*a*. The velocity is influenced by the resistance against movement of the spherical bodies in the inside space 1*a*, and the distance of movement also changes according to operating conditions.

Therefore, it is possible to make the number of the spherical bodies that collide against the poppet valve stochastically constant by receiving a plurality of the spherical bodies in the inside space in spite of changes in the resistance and operating conditions. A stable bounce restraining effect can be attained through achieving nearly constant probability of collision of the spherical bodies against the poppet valve by increasing the number of the spherical bodies. Further, the probability of the collision can be adjusted by receiving the spherical bodies in the inside space 1*a* together with fuel or lube oil or by a method described in the second embodiment explained later.

Figure 3:
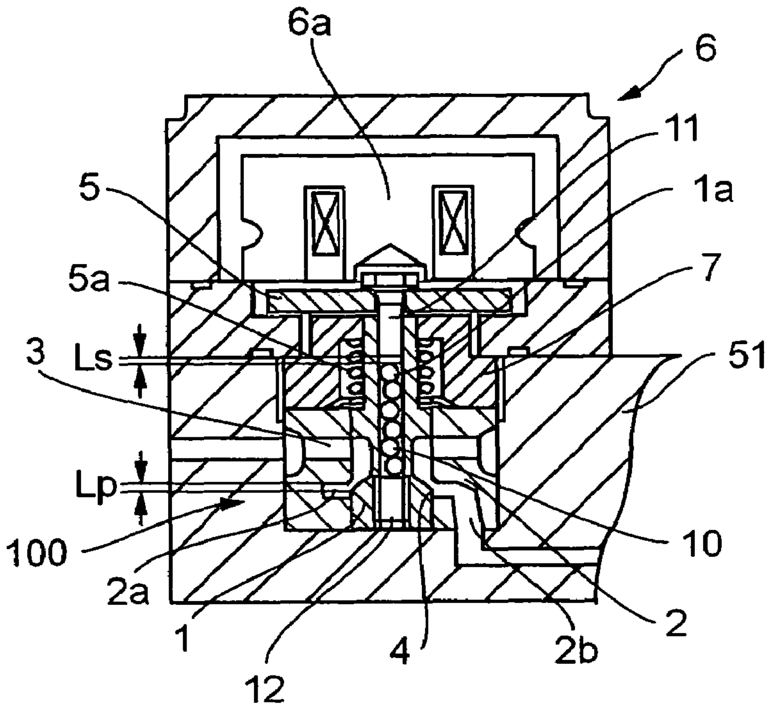
FIG. 3 is a drawing for explaining the relation between the stroke of the poppet valve and the movable range of spherical bodies received inside the poppet valve in the first embodiment shown in FIG. 1.

FIG. 3 is a drawing for explaining the relation between the stroke of the poppet valve and the movable range of spherical bodies received in the inside space 1*a* of the poppet valve in the first embodiment shown in FIG. 1.

In the first embodiment, it is preferable that the distance (Ls) of movement of the mass objects 10 in the inside space 1*a* in the axial direction of the poppet valve is defined to be equal to or smaller than the stroke (Lp) of reciprocation of the poppet valve, i.e. (Ls≦Lp) as shown in FIG. 3.

In this case, when the poppet valve 1 leaves the seat portion of the valve seat member 2 and moves downward, at least one of the spherical bodies comes into contact with the upper end of the inside space 1*a* without fail and moves downward together with the poppet valve 1, so the rebound when the bottom face of the poppet valve 1 sits on the seat face in the injector body 51 is restrained similarly as when the poppet valve 1 seats on the seat portion 4 of the valve seat member 2. Further, when the downward bouncing force is not completely counteracted and bouncing occurs, the vibration system consisting of the attraction force of the solenoid device 6, the mass of the poppet valve 1 including the armature 5, the spring force of the poppet valve spring 5*a*, and the spring constant at the seat portion 4 of the valve seat member 2 begins to vibrate and bouncing of the poppet valve 1 repeats, that is, bounce vibration occurs. When bounce vibration occurs, the spherical bodies 10 are allowed to reciprocate more than once in the inside space 1*a* due to Ls=≦Lp, and can exert an inertia force to the poppet valve 1 in the direction opposite to the vibration direction of the poppet valve bounce vibration so that the bounce vibration can be restrained.

In FIG. 3, component members the same as those of FIG. 1 are designated with the same reference numerals.

As has been described above, according to the first invention, rebounding of the poppet valve 1 when it seats on the seat portion 4 of the valve seat member 2 and on the seat face of the injector body 51 is restrained, and the occurrence of irregular injection beginning and injection end, variation of injection quantity, and irregular injection resulting from the bouncing of the poppet valve can be positively prevented.

Further, as the spherical bodies 10 received in the inside space 1*a* of the poppet valve 1 are solid bodies, they can be inserted easily into the inside space 1*a*. Fear of spilling them from the inside space 1*a* when inserting them or during operation of the engine is eliminated, handling is easy, and safety is increased.

Further, it is possible to have the spherical bodies received in the inside space of the poppet valve together with a liquid such as fuel or lubrication oil.

With this, by filling liquid such as fuel or lubrication oil in the inside space 1*a* together with the spherical bodies, the effect of restraining the rebound can be optimized by adjusting the resistance to the movement of the spherical bodies in the inside space 1*a* of the poppet valve 1 as mentioned before.

Second Embodiment

Figure 2:
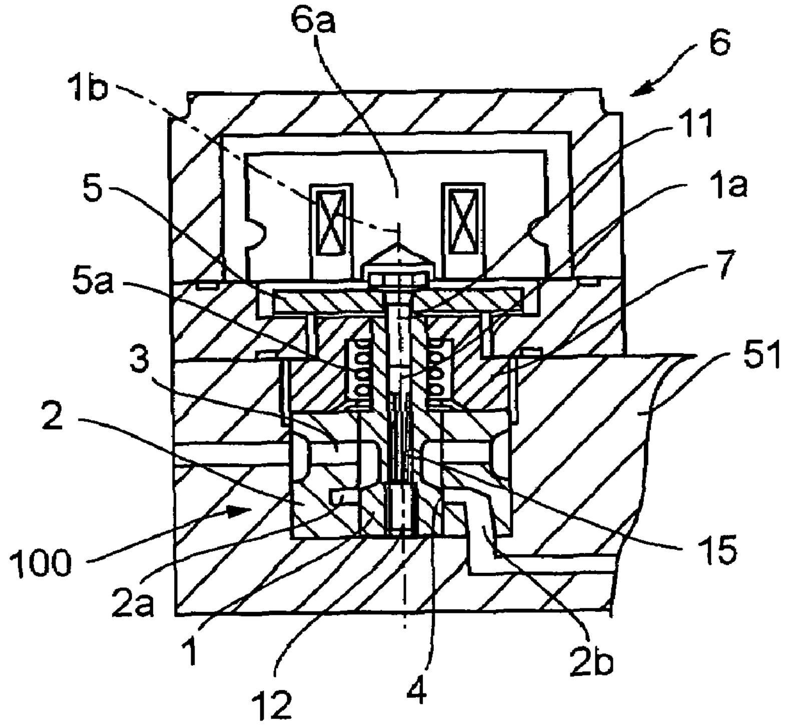
FIG. 2 is a drawing corresponding to FIG. 1 of a second embodiment.

FIG. 2 is a drawing of the second embodiment corresponding to FIG. 1.

In the second embodiment, a plurality of needle bodies 15 are received in the inside space 1*a* of the poppet valve 1 instead of the spherical bodies 10. Each of the needle bodies 15 is of needle-like or bar-like shape made of steel, rubber, or plastic material. A plurality of them are received in the inside space 1*a* to be movable in the axial direction 1*b* of the poppet valve 1 and capable of contacting with each other on their outer surfaces.

The other construction is the same as that of the first embodiment of FIG. 1, and component members the same as those of FIG. 1 are designated with the same reference numerals.

According to the second embodiment, as the needle bodies 15 received in the inside space 1*a* of the poppet valve 1 are of needle-like or bar-like shape, the number of collisions of the needle-like bodies against the poppet valve in the axial direction can be increased compared to the case of spherical bodies in which the spherical bodies collide with each other in the axial direction. Further, the contacting portion increases and the friction resistance when the needle-like bodies move in the inside space 1*a* of the poppet valve 1 can be increased. Accordingly, by these two effects, the time the needle bodies 15 collide against the upper end or lower end of the inside space 1*a* can be optimized for restraining rebounding of the poppet valve when it seats on the seat portion 4 of the valve seat member 2 or seats on the seat face of the injector body 51 as mentioned in the explanation of the first invention.

Third Embodiment

Figure 4:
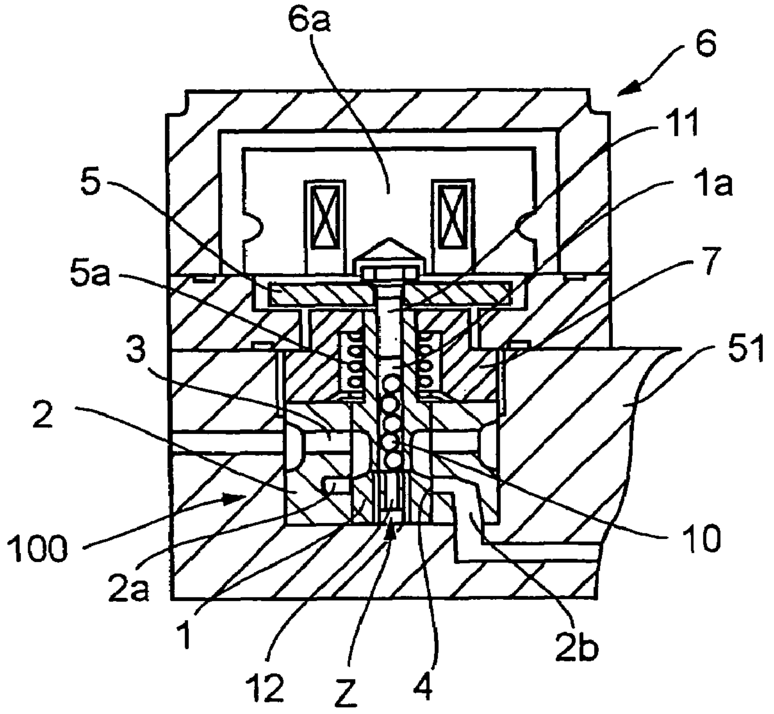
FIG. 4 is a drawing corresponding to FIG. 1 of a third embodiment.
Figure 5:
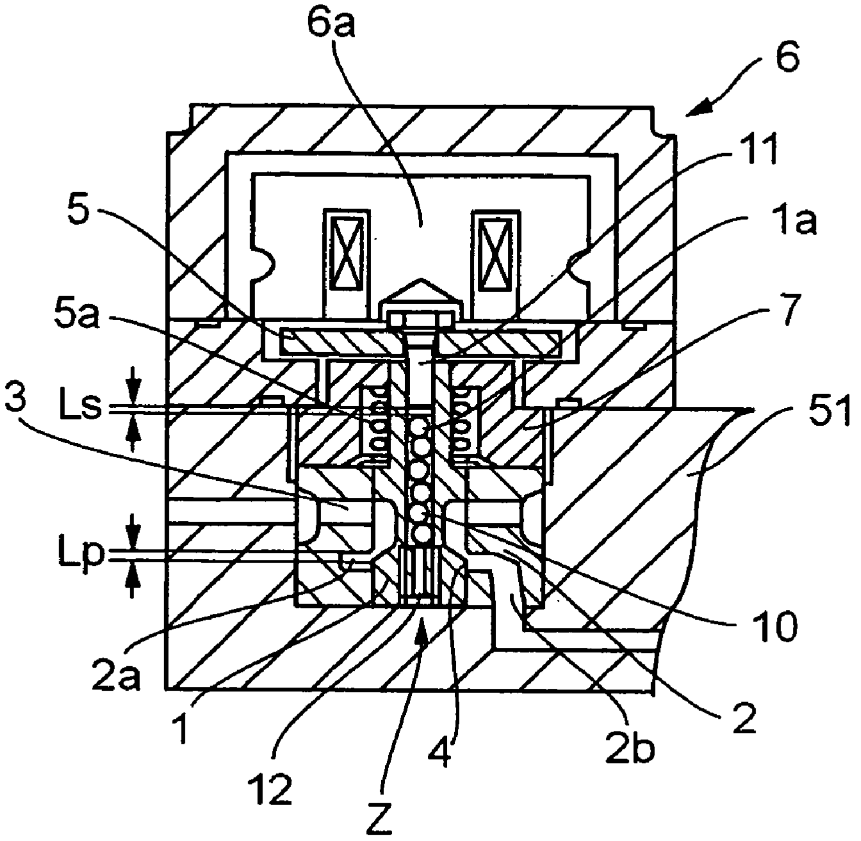
FIG. 5 is a drawing for explaining the relation between the stroke of the poppet valve and the movable range of spherical bodies received inside the poppet valve in the third embodiment shown in FIG. 4.
Figure 6:
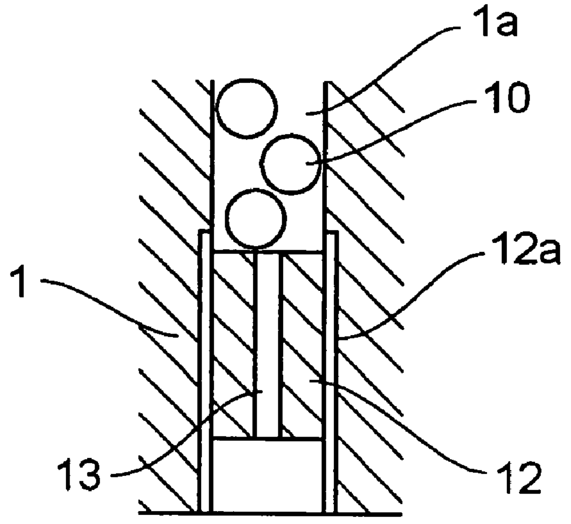
FIG. 6 is an enlarged detail of a part indicated with an arrow Z in the third embodiment shown in FIGS. 4 and 5.

FIG. 4 is a drawing of the third embodiment corresponding to FIG. 1. FIG. 5 is a drawing for explaining the relation between the stroke of the poppet valve and the movable range of spherical bodies received inside the poppet valve in the third embodiment shown in FIG. 4. FIG. 6 is an enlarged detail of the part indicated with an arrow Z in the third embodiment shown in FIG. 4 and FIG. 5.

According to the third embodiment, a plurality of spherical bodies 10 are received in an inside space 1*a* of a poppet valve 1 so that they can move axially therein, contacting with each other when the poppet valve 1 reciprocates, the same as is in the first embodiment. A small hole 13 is provided in a plug 12 plugging the inside space 1*a* through which the inside space 1*a* is communicated to an outside fuel passage, i.e. a passage near the poppet valve 1.

The other construction is the same as that of the first embodiment of FIG. 1, and component members the same as those of FIG. 1 are designated with the same reference numerals.

In the third embodiment, fuel can flow into or out from the inside space 1*a* of the poppet valve 1 through the small hole 13, allowing the inside space 1*a* to communicate to the outside fuel passage. Thus a dash pot function is realized, so the bouncing of the poppet valve 1 can be restrained by the damping effect of the dash pot function.

In this case also the spherical bodies 10 perform to restrain bouncing of the poppet valve by inertia force, similar to the first embodiment.

In the third embodiment, it is preferable that the distance (Ls) of movement of the mass objects in the inside space, where fuel oil can flow into or out from through the small hole, in the axial direction of the poppet valve is defined to be equal to or smaller than the stroke (Lp) of reciprocation of the poppet valve, i.e. (Ls=≦Lp) as shown in FIG. 5.

The effect is the same as described in the first embodiment.

In FIG. 5, component members the same as those of FIG. 4 are designated with the same reference numerals.

As described above, according to the third embodiment, by combining the construction having a dash pot function by providing the small hole 13 to allow communication of the inside space 1*a* of the poppet valve 1 to the outside fuel passage with the construction of the first embodiment to restrain bouncing by means of spherical bodies 10, the effect of restraining bouncing is further increased by being doubly effected by the damping effect of the dash pot function and the bounce restraining effect of the inertia force of the mass objects.

The spherical bodies 10 received in the inside space 1*a* can be replaced by the needle bodies 15 of the second embodiment.

Further, bouncing can be restrained only by the dash pot function without receiving, in the inside space 1*a*, the spherical bodies 10 or needle bodies 15.

According to the present invention, an electronic controlled fuel injection apparatus composed to control the fuel injection beginning and end by the reciprocation of the poppet valve improved in safety and eased in handling can be provided, in which effect of preventing or restraining bouncing of the poppet valve is increased by utilizing inertia and friction force arising from the reciprocating movement of the poppet valve.

The invention claimed is:

1. An electromagnetic controlled fuel injection apparatus comprising:
- a plunger for compressing fuel in a plunger chamber;
- a fuel passage communicating with the plunger chamber;
- a passage connecting to said fuel passage and to a spill passage communicating with a fuel return line;
- a poppet valve arranged to control fuel injection beginning and fuel injection end by opening and closing said passage connecting to said fuel passage and to said spill passage by reciprocation in a reciprocating direction, said poppet valve having a solenoid device and a poppet valve spring arranged to reciprocate said poppet valve in said reciprocating direction;
- a sealed space inside said poppet valve that extends in said reciprocating direction;
- a plurality of mass objects received in said sealed space in a single file column of said mass objects extending in said reciprocating direction such that said mass objects can move in said reciprocating direction while contacting with each other along said reciprocating direction, due to inertia force generated by reciprocating motion of said poppet valve.

2. The electromagnetic controlled fuel injection apparatus of claim 1, wherein said mass objects are provided in said sealed space so as to have a range of movement in said reciprocating direction Ls that is smaller than the stroke of reciprocation Lp of said poppet valve.

3. The electromagnetic controlled fuel injection apparatus of claim 1, wherein said mass objects are provided in said sealed space together with a liquid fuel or lubrication oil.

4. The electromagnetic controlled fuel injection apparatus of claim 3, wherein said mass objects are needle-like bodies made of a material that includes metal.

5. The electromagnetic controlled fuel injection apparatus of claim 1, wherein said mass objects are made of a material that includes metal.

6. An electromagnetic controlled fuel injection apparatus comprising:
- a plunger for compressing fuel in a plunger chamber;
- a fuel passage communicating with the plunger chamber;
- a passage connecting to said fuel passage and to a spill passage communicating with a fuel return line;
- a poppet valve arranged to control fuel injection beginning and fuel injection end by opening and closing said passage connecting to said fuel passage and to said spill passage by reciprocation in a reciprocating direction, said poppet valve having a solenoid device and a poppet valve spring arranged to reciprocate said poppet valve in said reciprocating direction;
- a sealed space inside said poppet valve that extends in said reciprocating direction;
- a plurality of mass objects received in said sealed space such that said mass objects can move in said reciprocating direction, while contacting with each other along said reciprocating direction, due to inertia force generated by reciprocating motion of said poppet valve;
- wherein said mass objects are needle-like bodies made of a material that includes metal.

7. An electromagnetic controlled fuel injection apparatus comprising:
- a plunger for compressing fuel in a plunger chamber;
- a fuel passage communicating with the plunger chamber;
- a passage connecting to said fuel passage and to a spill passage communicating with a fuel return line;
- a poppet valve arranged to control fuel injection beginning and fuel injection end by opening and closing said passage connecting to said fuel passage and to said spill passage by reciprocation in a reciprocating direction, said poppet valve having a solenoid device and a poppet valve spring arranged to reciprocate said poppet valve in said reciprocating direction;
- a space inside said poppet valve that extends in said reciprocating direction, said inside space having a small hole provided at one or both ends of said inside space so as to communicate said inside space with fuel such that fuel can flow into and out of said inside space through said small hole by reciprocating motion of said poppet valve;
- a plurality of mass objects received in said inside space such that said mass objects can move in said reciprocating direction, while contacting with each other along said reciprocating direction, due to inertia force generated by the reciprocating motion of said poppet valve.

8. The electromagnetic controlled fuel injection apparatus of claim 7, wherein said mass objects are provided in said sealed space so as to have a range of movement in said reciprocating direction Ls that is smaller than the stroke of reciprocation Lp of said poppet valve.

9. An electromagnetic controlled fuel injection apparatus comprising:
- a plunger for compressing fuel in a plunger chamber;
- a fuel passage communicating with the plunger chamber;
- a passage connecting to said fuel passage and to a spill passage communicating with a fuel return line;
- a poppet valve arranged to control fuel injection beginning and fuel injection end by opening and closing said passage connecting to said fuel passage and to said spill passage by reciprocation in a reciprocating direction, said poppet valve having a solenoid device and a poppet valve spring arranged to reciprocate said poppet valve in said reciprocating direction;
- a sealed space inside said poppet valve that extends in said reciprocating direction;

a plurality of mass objects received in said sealed space such that said mass objects can move in said reciprocating direction, while contacting with each other along said reciprocating direction, due to inertia force generated by reciprocating motion of said poppet valve, wherein said mass objects are provided in said sealed space so as to have a range of movement in said reciprocating direction Ls that is smaller than the stroke of reciprocation Lp of said poppet valve, and wherein said mass objects are needle-like bodies made of a material that includes metal.

10. An electromagnetic controlled fuel injection apparatus comprising:

a plunger for compressing fuel in a plunger chamber;

a fuel passage communicating with the plunger chamber;

a passage connecting to said fuel passage and to a spill passage communicating with a fuel return line;

a poppet valve arranged to control fuel injection beginning and fuel injection end by opening and closing said passage connecting to said fuel passage and to said spill passage by reciprocation in a reciprocating direction, said poppet valve having a solenoid device and a poppet valve spring arranged to reciprocate said poppet valve in said reciprocating direction;

a sealed space inside said poppet valve that extends in said reciprocating direction;

a plurality of mass objects received in said sealed space such that said mass objects can move in said reciprocating direction, while contacting with each other along said reciprocating direction, due to inertia force generated by reciprocating motion of said poppet valve, wherein said mass objects are provided in said sealed space together with a liquid fuel or lubrication oil, and wherein said mass objects are needle-like bodies made of a material that includes metal.

* * * * *